US012679466B2

(12) United States Patent
Lee et al.

(10) Patent No.: US 12,679,466 B2
(45) Date of Patent: Jul. 14, 2026

(54) SIDE SILL ASSEMBLY OF VEHICLE

(71) Applicants: Hyundai Motor Company, Seoul (KR); Kia Corporation, Seoul (KR)

(72) Inventors: Hyeong-Seok Lee, Gwangju (KR); Huen-Sick Min, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 323 days.

(21) Appl. No.: 18/503,272

(22) Filed: Nov. 7, 2023

(65) Prior Publication Data

US 2024/0217586 A1    Jul. 4, 2024

(30) Foreign Application Priority Data

Dec. 28, 2022    (KR) ........................ 10-2022-0187623

(51) Int. Cl.
B62D 25/02 (2006.01)

(52) U.S. Cl.
CPC .................................. B62D 25/025 (2013.01)

(58) Field of Classification Search
CPC .................................................. B62D 25/025
See application file for complete search history.

(56) References Cited

U.S. PATENT DOCUMENTS

| | | | | | |
|---|---|---|---|---|---|
| 5,924,765 | A * | 7/1999 | Lee ...................... | B62D 25/025 |
| | | | | 267/116 |
| 6,179,355 | B1 * | 1/2001 | Chou ...................... | B60R 19/18 |
| | | | | 293/121 |

| | | | | | |
|---|---|---|---|---|---|
| 6,409,257 | B1 * | 6/2002 | Takashina ............ | B62D 21/157 |
| | | | | 296/203.03 |
| 8,292,356 | B2 * | 10/2012 | Ishigame ............... | B60N 2/005 |
| | | | | 296/193.07 |
| 8,641,131 | B2 * | 2/2014 | Honda .................. | B62D 29/005 |
| | | | | 296/203.03 |
| 10,293,861 | B2 * | 5/2019 | Jeong ................... | B62D 21/157 |
| 11,498,620 | B2 * | 11/2022 | Hwang ................ | B62D 27/065 |
| 2019/0217898 | A1 * | 7/2019 | Tchepikov ........... | B62D 29/007 |
| 2020/0148271 | A1 * | 5/2020 | Kim ...................... | B62D 25/025 |
| 2022/0041219 | A1 * | 2/2022 | Son ....................... | B62D 21/157 |

FOREIGN PATENT DOCUMENTS

KR        19970051616 U        9/1997

OTHER PUBLICATIONS

Xu et al. CN111845956; Vehicle Doorsill Structure and Vehicle; Oct. 30, 2020. (Year: 2020).*

* cited by examiner

*Primary Examiner* — Jonathan Malikasim

(74) *Attorney, Agent, or Firm* — Slater Matsil, LLP

(57)        ABSTRACT

An embodiment side sill assembly of a vehicle includes a side sill inner, a side sill inner reinforcement connected to a front end of the side sill inner and a front pillar inner lower of the vehicle, a side sill inner pipe disposed in a length direction of the vehicle and connected to the front end of the side sill inner, and a side sill inner extension connecting the side sill inner reinforcement and the side sill inner pipe to the side sill inner.

20 Claims, 10 Drawing Sheets

FIG. 7

SIDE SILL ASSEMBLY OF VEHICLE

CROSS-REFERENCE TO RELATED APPLICATIONS

This application claims the benefit of Korean Patent Application No. 10-2022-0187623, filed on Dec. 28, 2022, which application is hereby incorporated herein by reference.

TECHNICAL FIELD

Exemplary embodiments of the present disclosure relate to a side sill assembly of a vehicle.

BACKGROUND

A lower side surface of a vehicle is provided with a side sill in a length direction of the vehicle and becomes a structure body at the lower side surface of the vehicle.

The side sill is configured by bonding a side sill inner and a side sill outer to each other, and a reinforcing member may be provided between the side sill inner and the side sill outer.

In recent years, the spread of electric vehicles has been expanding. In general, in the electric vehicle, since a battery is installed in a lower portion of a floor panel of the electric vehicle, a vehicle body should be formed to prevent the battery from being damaged in the event of a collision.

In the event of a head-on collision (especially, a small overlap collision) or a side collision, a structure of the side sill should sufficiently protect the battery.

In addition, even in order to reduce injuries to occupants, the side sill requires sufficient rigidity against a head-on collision and a side collision.

SUMMARY

Exemplary embodiments of the present disclosure relate to a side sill assembly of a vehicle that forms a structure of a lower side surface of the vehicle. Particular embodiments relate to a side sill assembly of a vehicle that improves head-on collision and side collision performance by expanding connectivity to a front structure of the vehicle and strengthening side rigidity.

An embodiment of the present disclosure is directed to a side sill assembly of a vehicle that is capable of absorbing a collision load in the event of a small overlap collision and supporting a collision load introduced in the event of a side collision.

Other objects and advantages of embodiments of the present disclosure can be understood by the following description and become apparent with reference to the embodiments of the present disclosure. Also, it is obvious to those skilled in the art to which the present disclosure pertains that the objects and advantages of embodiments of the present disclosure can be realized by the means as claimed and combinations thereof.

In accordance with an embodiment of the present disclosure, there is provided a side sill assembly of a vehicle including a side sill inner, a side sill inner reinforcement connected to a front end of the side sill inner and a front pillar inner lower of the vehicle, a side sill inner pipe disposed in a length direction of the vehicle and connected to the front end of the side sill inner, and a side sill inner extension configured to connect the side sill inner reinforcement and the side sill inner pipe to the side sill inner.

The side sill inner reinforcement may surround an outer side of the side sill inner pipe.

A plurality of slits may be formed in the side sill inner pipe at intervals in the length direction of the vehicle.

The slits may be formed on upper and lower surfaces of the side sill inner pipe.

The side sill inner pipe may be provided as a plurality of side sill inner pipes at intervals in a height direction of the vehicle.

The side sill inner reinforcement may surround the side sill inner pipes vertically adjacent to each other in different directions.

The side sill inner extension may be coupled to an outer surface of the side sill inner pipe in a width direction of the vehicle.

A cross section of the side sill inner reinforcement may be formed to alternately face an inner side and an outer side in the width direction of the vehicle.

An upper end and a lower end of the side sill inner reinforcement may be connected across the front pillar inner and the side sill inner, respectively.

The side sill inner pipe may be formed to be longer than the side sill inner reinforcement.

A predetermined length from a front end of the side sill inner extension may be connected to the side sill inner reinforcement, and a length behind the predetermined length may be connected to the side sill inner pipe.

Upper and lower ends of the side sill inner extension may be connected to the side sill inner at a portion of the side sill inner extension connected to the side sill inner pipe.

The side sill assembly may further include a honeycomb reinforcement lower having a bottom surface fastened to the side sill inner and a honeycomb reinforcement upper connected to front and rear ends of the honeycomb reinforcement lower, wherein both ends of an assembly of the honeycomb reinforcement lower and the honeycomb reinforcement upper may be open in a width direction of the vehicle.

The honeycomb reinforcement upper and the honeycomb reinforcement lower may be continuously and repeatedly disposed in the length direction of the vehicle.

Among the honeycomb reinforcement uppers and the honeycomb reinforcement lowers, front ends of a honeycomb reinforcement upper and a honeycomb reinforcement lower, which are located at a foremost side of the vehicle in the length direction of the vehicle, may be connected to the side sill inner extension.

A battery mount to which a battery mounting bolt is fastened may be coupled to the side sill inner and the honeycomb reinforcement lower.

An upper end of the battery mount may be fixed to the honeycomb reinforcement upper.

A concave portion may be formed in an intermediate portion of the honeycomb reinforcement upper.

BRIEF DESCRIPTION OF THE DRAWINGS

FIG. 7 is a cross-sectional view taken along line II-II of FIG. 5.

DETAILED DESCRIPTION OF ILLUSTRATIVE EMBODIMENTS

Figure 1:
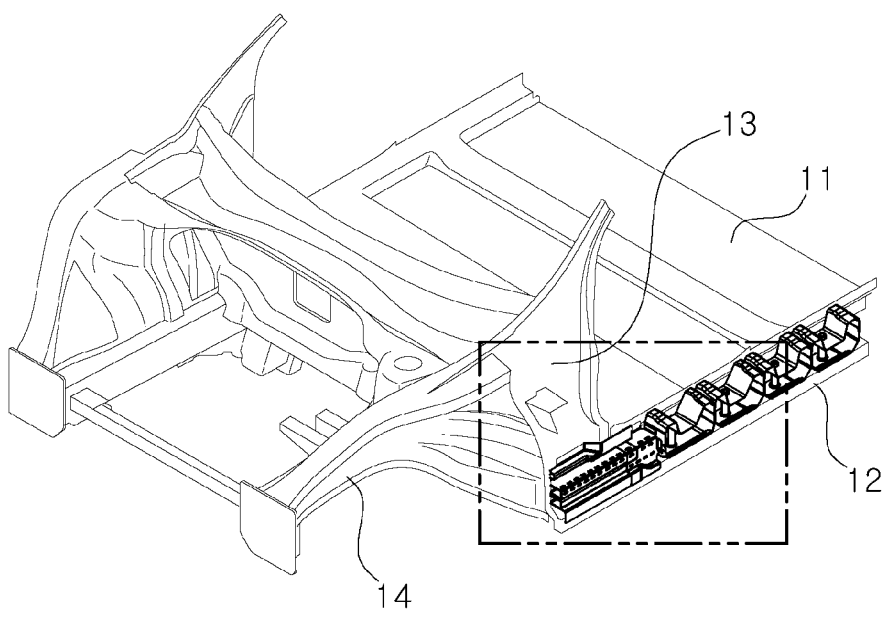
FIG. 1 is a perspective view illustrating a vehicle body to which a side sill assembly of a vehicle according to an embodiment of the present disclosure is applied.
Figure 2:
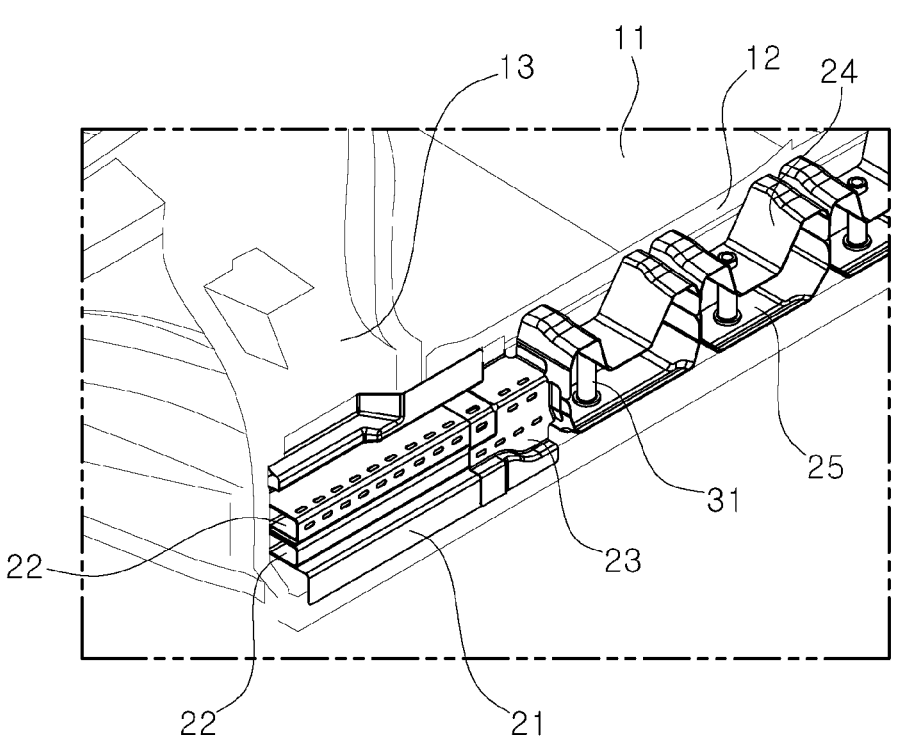
FIG. 2 is an enlarged perspective view illustrating a main portion of FIG. 1.

Hereinafter, a side sill assembly of a vehicle according to embodiments of the present disclosure will be described in detail with reference to the accompanying drawings.

The side sill assembly of a vehicle according to an embodiment of the present disclosure includes a side sill inner 12, a side sill inner reinforcement 21 connected to a front end of the side sill inner 12 and a front pillar inner lower 13 of the vehicle, a side sill inner pipe 22 disposed in a length direction of the vehicle and connected to the front end of the side sill inner 12, and a side sill inner extension 23 configured to connect the side sill inner reinforcement 21 and the side sill inner pipe 22 to the side sill inner 12.

In the side sill assembly of the vehicle, upper and lower portions of the side sill inner 12 and upper and lower portions a side sill outer (not shown) are fastened to each other, respectively, thereby forming a structure in the length direction of the vehicle at a lower end of a side surface of the vehicle.

A side end of a floor panel 11 is fastened to the side sill inner 12. A battery is installed in a lower portion of the floor panel 11.

According to embodiments of the present disclosure, in order for the side sill assembly connected to the side end of the floor panel 11 to improve vehicle body rigidity against a head-on collision, a reinforcing structure is provided at a front end of the side sill assembly.

The side sill inner reinforcement 21 is connected to the front end of the side sill inner 12 and the front pillar inner lower 13 of the vehicle. Since the side sill inner reinforcement 21 is additionally provided in a portion where the side sill inner 12 and the front pillar inner lower 13 are connected, the side sill inner reinforcement 21 supports a load input from a front end of the vehicle in the event of a head-on collision of the vehicle, particularly, a small overlap collision. Therefore, the side sill inner 12 and the front pillar inner lower 13 are prevented from being deformed.

In particular, looking at a cross section of a surface perpendicular to the length direction of the vehicle, the side sill inner reinforcement 21 is formed to alternately face an inner side and an outer side of the vehicle in a width direction. That is, the cross section of the side sill inner reinforcement 21 is formed in a corrugated shape in the form of an accordion to increase a cross section supporting a load, thereby sufficiently supporting a load input in the length direction of the vehicle.

An upper end and a lower end of the side sill inner reinforcement 21 are connected across the front pillar inner lower 13 and the side sill inner 12, respectively. That is, some portion of a front side of the side sill inner reinforcement 21 is bonded to the front pillar inner lower 13, and the remaining portion of the front side thereof is bonded to the side sill inner 12.

The side sill inner pipe 22 is disposed in the length direction of the vehicle and is connected to the front end of the side sill inner 12.

The side sill inner pipe 22 together with the side sill inner reinforcement 21 supports a load input from the front end of the vehicle. To this end, the side sill inner reinforcement 21 is formed to surround an outer side of the side sill inner pipe 22.

Figure 3:
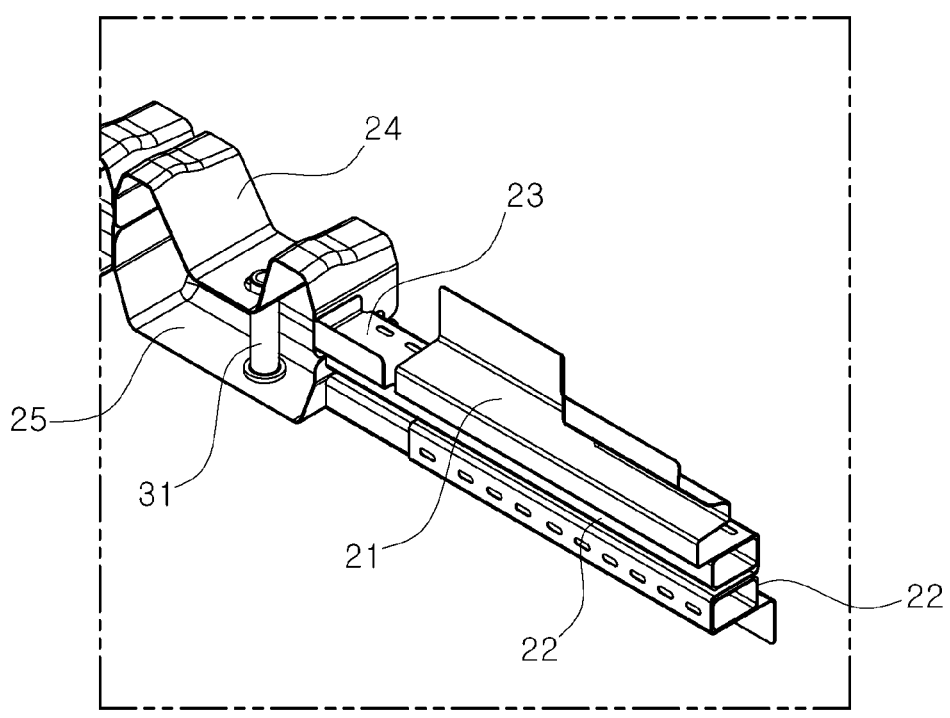
FIG. 3 is a perspective view illustrating the side sill assembly of a vehicle according to an embodiment of the present disclosure when viewed from another direction.
Figure 4:
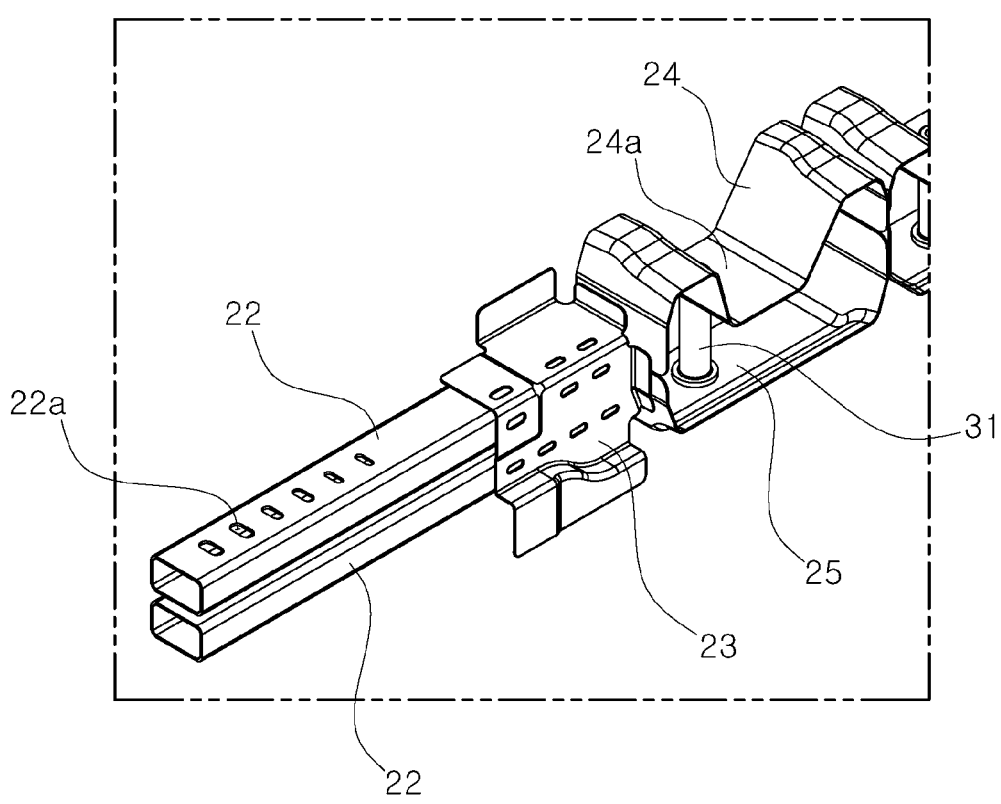
FIG. 4 is a perspective view illustrating a connection relationship between a side sill inner pipe and a side sill inner extension in the side sill assembly of a vehicle according to an embodiment of the present disclosure.
Figure 5:
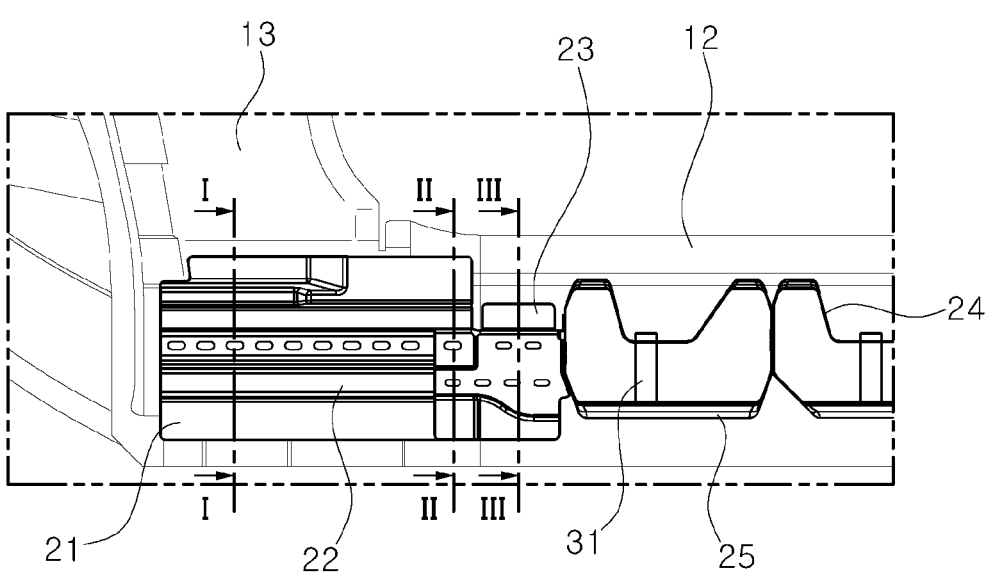
FIG. 5 is a side view illustrating the side sill assembly of a vehicle according to an embodiment of the present disclosure.
Figure 6:
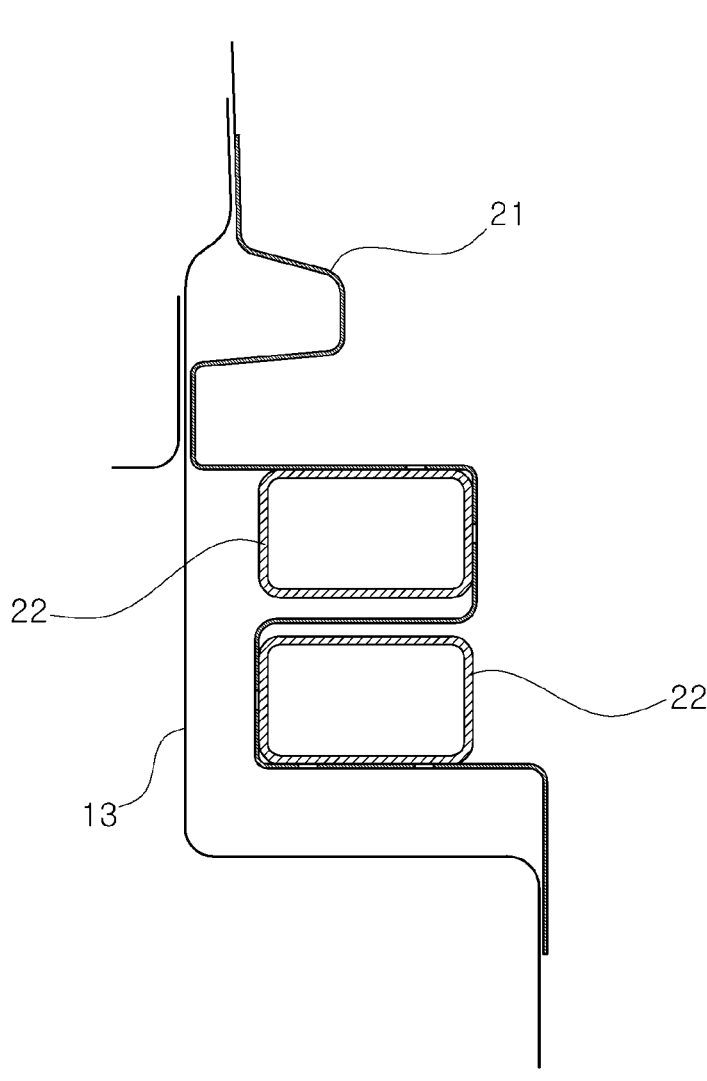
FIG. 6 is a cross-sectional view taken along line I-I in FIG. 5.

A plurality of side sill inner pipes 22 are disposed at intervals in a height direction of the vehicle. FIGS. 3 and 4 show a configuration in which two side sill inner pipes 22 are vertically disposed. Since the plurality of the side sill inner pipes 22 are disposed in the height direction of the vehicle, the load input from the front end of the vehicle may be sufficiently supported by the plurality of side sill inner pipes 22.

Meanwhile, the side sill inner pipes 22 disposed adjacent to each other in the height direction of the vehicle are surrounded by the side sill inner reinforcement 21 in different directions. That is, FIG. 3 shows that the side sill inner pipe 22 positioned at an upper portion is surrounded by the side sill inner reinforcement 21 in an outer direction of the vehicle, and the side sill inner pipe 22 positioned at a lower portion is surrounded by the side sill inner reinforcement 21 in an inner direction of the vehicle.

A plurality of slits 22a are formed in the side sill inner pipe 22 at intervals in a length direction of the side sill inner pipe 22. The slit 22a induces deformation of the side sill inner pipe 22 in the event of a head-on collision to absorb some of a collision load. The slit 22a may be formed on each surface of the side sill inner pipe 22. Preferably, the slit 22a is formed on upper and lower surfaces of the side sill inner pipe 22. In addition, the slit 22a positioned at the front side of the vehicle is formed to be greater than the slit 22a positioned at a rear side of the vehicle. For example, a size of the slit 22a may be formed to be reduced toward the rear side of the vehicle. This is because, in the event of a head-on collision, a large amount of deformation is induced in the front side of the side sill inner pipe 22 to absorb a large amount of a collision load.

Figure 7:
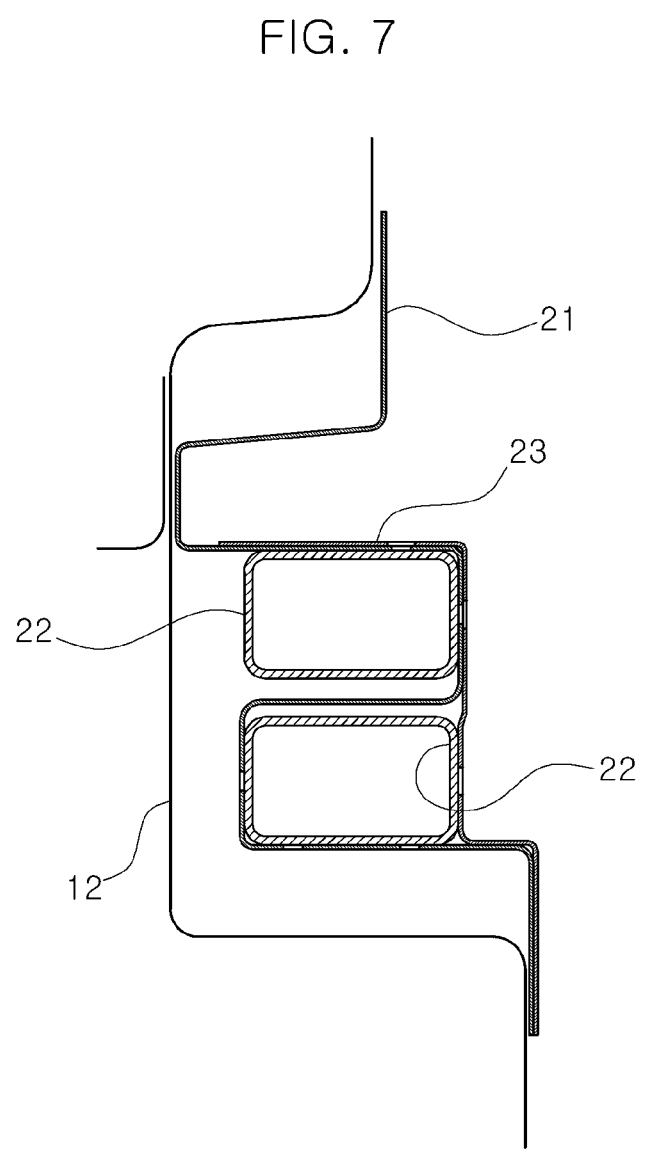
Figure 8:
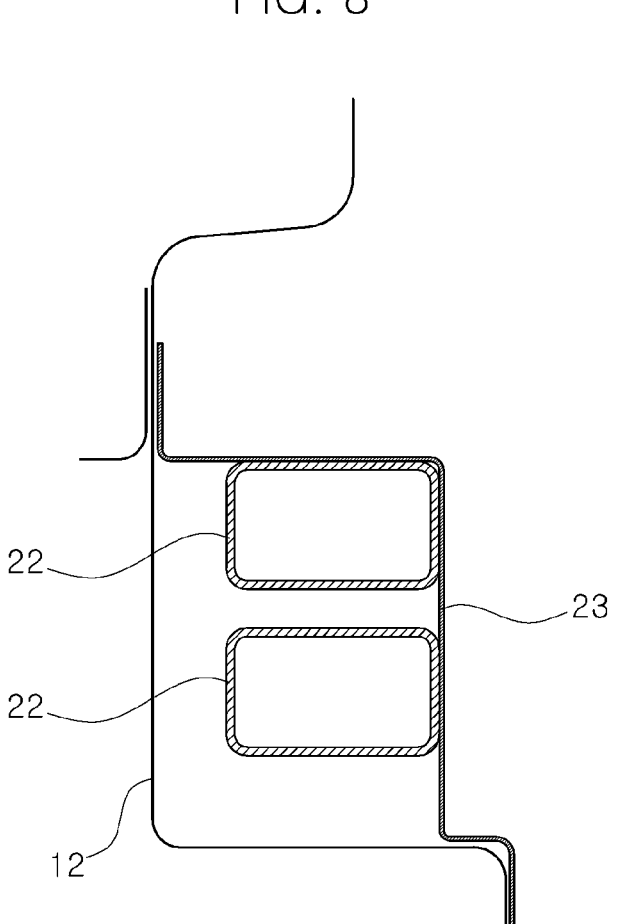
FIG. 8 is a cross-sectional view taken along line III-III of FIG. 5.

The side sill inner extension 23 connects the side sill inner reinforcement 21 and the side sill inner pipe 22 to the side sill inner 12. A front end of the side sill inner extension 23 is connected to the side sill inner reinforcement 21 in an outer direction of the vehicle (see FIG. 7). In addition, the side sill inner pipe 22 is connected from an intermediate portion to a rear end of the side sill inner extension 23 in the outer direction of the vehicle, and upper and lower ends of the side sill inner extension 23 are connected to the side sill inner 12 (see FIG. 8). Since the front end and a portion adjacent thereto of the side sill inner extension 23, that is, a predetermined length from the front end thereof, is connected to the side sill inner reinforcement 21, and a length after the intermediate portion is connected to the side sill inner pipe 22, the side sill inner pipe 22 is formed to be longer than the side sill inner reinforcement 21.

Figure 9:
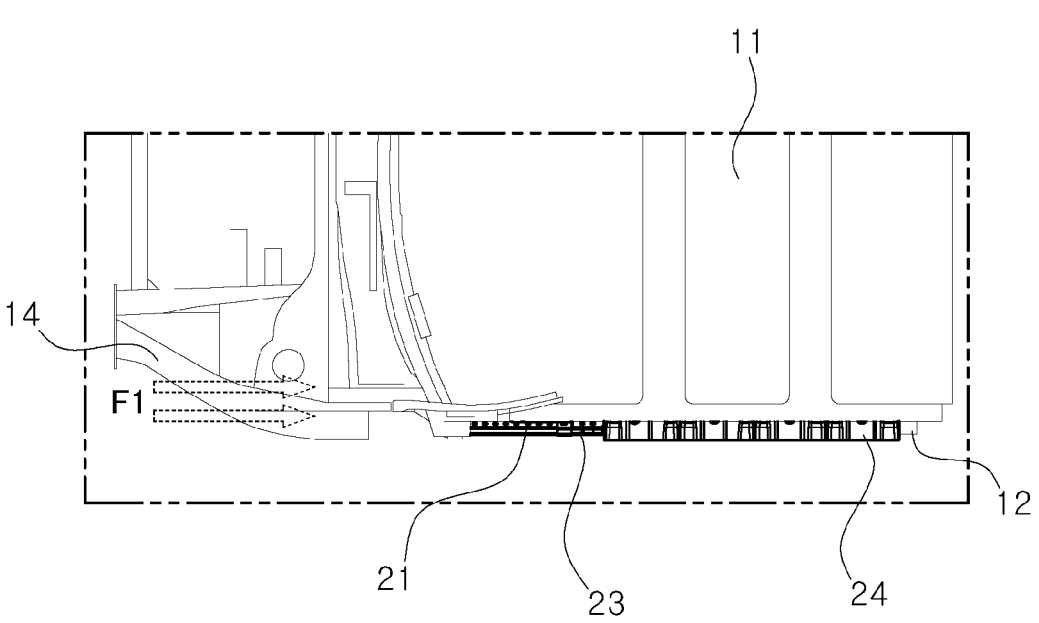
FIG. 9 is a plan view illustrating a state in which a collision load is input to the side sill assembly of a vehicle according to an embodiment of the present disclosure in the event of a head-on collision.

FIG. 9 shows a state in which a collision load F1 is input in the event of a head-on collision of the vehicle, particularly, a small overlap collision. In the event of a small overlap collision, the collision load F1 is directly transmitted to the side sill assembly through the side sill inner reinforcement 21, the side sill inner pipe 22, and the side sill inner extension 23 without passing through the front side member 14. As the side sill inner reinforcement 21, the side sill inner pipe 22, and the side sill inner extension 23 support the collision load F1 in front of the side sill inner 12, and the side sill inner pipe 22 is deformed, some of the collision load F1 is absorbed so that rigidity of the side sill assembly in the length direction of the vehicle can be improved. Therefore, deformation of an occupant compartment may be prevented to reduce injuries of occupants.

In addition, in order to improve vehicle body rigidity of the side sill assembly against a side collision, a honeycomb reinforcement upper 24 and a honeycomb reinforcement lower 25 are provided in the side sill assembly.

The honeycomb reinforcement lower 25 is formed to be concave and connected to a bottom surface of the side sill inner 12.

An overall shape of the honeycomb reinforcement upper 24 is formed to be convex, and thus front and rear ends of the honeycomb reinforcement upper 24 are connected to front and rear ends of the honeycomb reinforcement lower 25, respectively.

The front and rear ends of the honeycomb reinforcement upper 24 and the honeycomb reinforcement lower 25 are bonded to each other, and thus both ends of an assembly of the honeycomb reinforcement upper 24 and the honeycomb reinforcement lower 25 are open in the width direction of the vehicle. This hollow structure is continuously and repeatedly disposed in the length direction of the vehicle.

The assembly of the honeycomb reinforcement upper 24 and the honeycomb reinforcement lower 25 is connected to the side sill inner extension 23. That is, among honeycomb reinforcement uppers 24 and honeycomb reinforcement lowers 25, a honeycomb reinforcement upper 24 and a honeycomb reinforcement lower 25, which are located at the foremost side of the vehicle in the length direction of the vehicle, are connected to the side sill inner extension 23.

Meanwhile, a concave portion 24a is formed in an intermediate portion of the honeycomb reinforcement upper 24, and thus the shape of the honeycomb reinforcement upper 24 is formed in the form of an "M." Since the concave portion 24a is formed in the honeycomb reinforcement upper 24, a cross-sectional area of the honeycomb reinforcement upper 24 may be increased to sufficiently support collision energy in the event of a side collision.

A battery mount 31 for mounting a battery is fastened to the side sill inner 12 and the honeycomb reinforcement lower 25. A mounting bolt for mounting the battery to the side sill assembly is fastened to the battery mount 31. A lower end of the battery mount 31 may be fastened to the side sill inner 12 and the honeycomb reinforcement lower 25 to mount the battery.

In addition, an upper end of the battery mount 31 is fixed to the honeycomb reinforcement upper 24.

Since the upper end and the lower end of the battery mount 31 are fixed, the side sill inner 12, the honeycomb reinforcement lower 25, and the honeycomb reinforcement upper 24 also serve to reinforce a structure for mounting the battery. Thus, when a heavy battery is mounted, a weight of the battery is supported.

Figure 10:
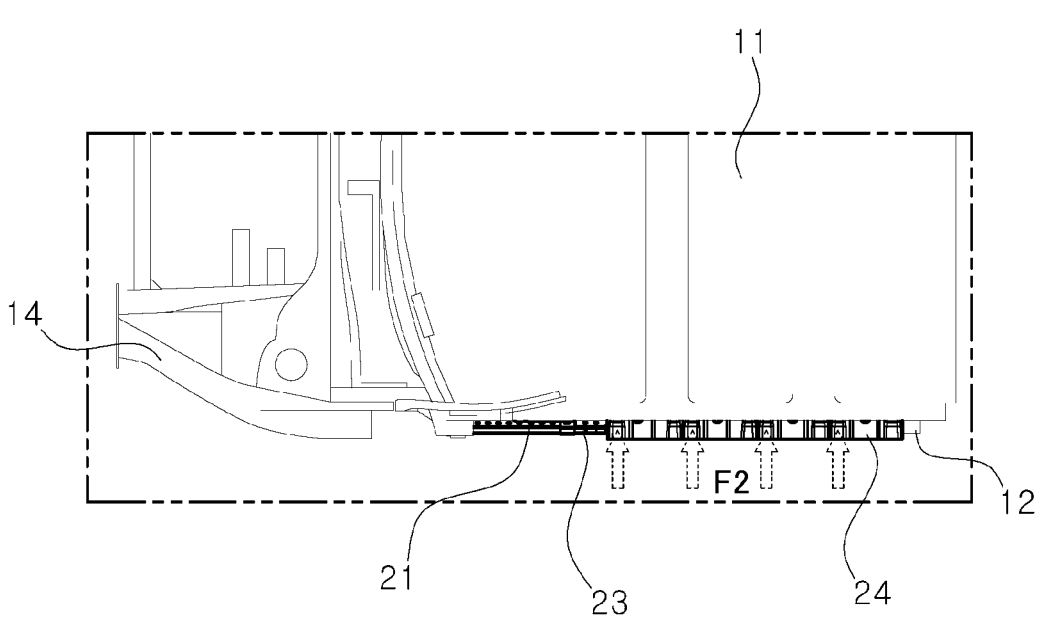
FIG. 10 is a plan view illustrating a state in which a collision load is input to the side sill assembly of a vehicle according to an embodiment of the present disclosure in the event of a side collision.

Referring to FIG. 10, even when a collision load F2 due to a side collision is input to the side sill assembly in the event of the side collision, the honeycomb reinforcement upper 24 and the honeycomb reinforcement lower 25 additionally support the collision load F2, thereby improving rigidity of the side sill assembly against a side collision.

In accordance with a side sill assembly of a vehicle of embodiments of the present disclosure, which has the above-described configuration, in the event of a head-on collision of a vehicle, especially, a small overlap collision, since a side sill inner pipe absorbs a collision load and a side sill inner reinforcement supports the collision load, deformation of a front pillar inner lower and a side sill inner can be prevented. In the event of the small overlap collision, since the deformation of the side sill inner is prevented, deformation of an occupant compartment and damage to a battery can be prevented.

In addition, since a honeycomb reinforcement upper and a honeycomb reinforcement lower support a collision load introduced in the event of a side collision, it is possible to prevent a phenomenon of the deformation of the occupant compartment or the damage to the battery due to the side collision.

While embodiments of the present disclosure have been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. A side sill assembly of a vehicle, the side sill assembly comprising:
   a side sill inner;
   a side sill inner reinforcement connected to a front end of the side sill inner and a front pillar inner lower of the vehicle;
   a side sill inner pipe disposed in a length direction of the vehicle and connected to the front end of the side sill inner; and
   a side sill inner extension connecting the side sill inner reinforcement and the side sill inner pipe to the side sill inner,
   wherein the side sill inner pipe comprises a plurality of side sill inner pipes disposed at intervals in a height direction of the vehicle,
   wherein the side sill inner reinforcement surrounds in different directions side sill inner pipes vertically adjacent to each other, and
   wherein the side sill inner reinforcement is arranged horizontally between the side sill inner pipes vertically adjacent to each other.

2. The side sill assembly of claim 1, wherein the side sill inner reinforcement surrounds an outer side of the side sill inner pipe.

3. The side sill assembly of claim 1, wherein slits are disposed in the side sill inner pipe at intervals in the length direction of the vehicle.

4. The side sill assembly of claim 3, wherein the slits are disposed on upper and lower surfaces of the side sill inner pipe.

5. The side sill assembly of claim 1, wherein the side sill inner extension is coupled to an outer surface of the side sill inner pipe in a width direction of the vehicle.

6. The side sill assembly of claim 1, wherein a cross section of the side sill inner reinforcement is formed to alternately face an inner side and an outer side in a width direction of the vehicle.

7. The side sill assembly of claim 1, wherein an upper end and a lower end of the side sill inner reinforcement are connected across the front pillar inner and the side sill inner, respectively.

8. The side sill assembly of claim 1, wherein the side sill inner pipe is longer than the side sill inner reinforcement.

9. The side sill assembly of claim 1, wherein a predetermined length from a front end of the side sill inner extension is connected to the side sill inner reinforcement, and a length behind the predetermined length is connected to the side sill inner pipe.

10. The side sill assembly of claim 9, wherein upper and lower ends of the side sill inner extension are connected to the side sill inner at a portion of the side sill inner extension connected to the side sill inner pipe.

11. A side sill assembly of a vehicle, the side sill assembly comprising:

a side sill inner;

a side sill inner reinforcement connected to a front end of the side sill inner and a front pillar inner lower of the vehicle;

a side sill inner pipe disposed in a length direction of the vehicle and connected to the front end of the side sill inner;

a side sill inner extension connecting the side sill inner reinforcement and the side sill inner pipe to the side sill inner;

a honeycomb reinforcement lower having a bottom surface fastened to the side sill inner; and a honeycomb reinforcement upper connected to front and rear ends of the honeycomb reinforcement lower, wherein both ends of an assembly of the honeycomb reinforcement lower and the honeycomb reinforcement upper are open in a width direction of the vehicle, wherein the side sill inner pipe comprises a plurality of side sill inner pipes disposed at intervals in a height direction of the vehicle, wherein the side sill inner reinforcement surrounds in different directions side sill inner pipes vertically adjacent to each other, and wherein the side sill inner reinforcement is horizontally formed between the side sill inner pipes vertically adjacent to each other.

12. The side sill assembly of claim 11, wherein the honeycomb reinforcement upper and the honeycomb reinforcement lower are continuously and repeatedly disposed in the length direction of the vehicle.

13. The side sill assembly of claim 12, wherein, among the honeycomb reinforcement uppers and the honeycomb reinforcement lowers, front ends of the honeycomb reinforcement upper and the honeycomb reinforcement lower located at a foremost side of the vehicle in the length direction of the vehicle are connected to the side sill inner extension.

14. The side sill assembly of claim 11, further comprising:

a battery mount coupled to the side sill inner and the honeycomb reinforcement lower; and a battery mounting bolt fastened to the battery mount.

15. The side sill assembly of claim 14, wherein an upper end of the battery mount is fixed to the honeycomb reinforcement upper.

16. The side sill assembly of claim 11, wherein a concave portion is defined in an intermediate portion of the honeycomb reinforcement upper.

17. A vehicle comprising:

a vehicle body comprising a front side member, a front pillar inner lower coupled to the front side member, and a floor panel;

a side sill inner, wherein a side end of the floor panel is fastened to the side sill inner;

a side sill inner pipe disposed in a length direction of the vehicle and connected to a front end of the side sill inner;

a side sill inner reinforcement connected to the front end of the side sill inner and the front pillar inner lower, wherein the side sill inner reinforcement surrounds an outer side of the side sill inner pipe; and a side sill inner extension connecting the side sill inner reinforcement and the side sill inner pipe to the side sill inner, wherein the side sill inner pipe comprises a plurality of side sill inner pipes disposed at intervals in a height direction of the vehicle, wherein the side sill inner reinforcement surrounds in different directions side sill inner pipes vertically adjacent to each other, and wherein the side sill inner reinforcement is horizontally located between the side sill inner pipes vertically adjacent to each other.

18. The vehicle of claim 17, further comprising:

a honeycomb reinforcement lower having a bottom surface fastened to the side sill inner; and a honeycomb reinforcement upper connected to front and rear ends of the honeycomb reinforcement lower, wherein both ends of an assembly of the honeycomb reinforcement lower and the honeycomb reinforcement upper are open in a width direction of the vehicle.

19. The vehicle of claim 17, wherein the side sill inner extension is coupled to an outer surface of the side sill inner pipe in a width direction of the vehicle.

20. The vehicle of claim 17, wherein an upper end and a lower end of the side sill inner reinforcement are connected across the front pillar inner and the side sill inner, respectively.

* * * * *